United States Patent [19]

Dewez et al.

[11] Patent Number: 4,717,231
[45] Date of Patent: Jan. 5, 1988

[54] INTERCONNECTING AND DISTRIBUTING BOX FOR OPTICAL FIBERS

[76] Inventors: Vincent Dewez, 150, rue Saint Maur, 75011 Paris; Jean-Pierre Michaux, 75, rue des Pyrénées, 75020 Paris; Daniel M. Mouliac, 12, rue Yves Farges, 94500 Champigny, all of France

[21] Appl. No.: 568,503

[22] Filed: Jan. 5, 1984

[30] Foreign Application Priority Data

Jan. 5, 1983 [FR] France .................. 83 00075

[51] Int. Cl.⁴ .............................................. G02B 6/36
[52] U.S. Cl. .............................. 350/96.20; 350/96.10; 350/96.21
[58] Field of Search .............. 350/96.20, 96.21, 96.22

[56] References Cited

U.S. PATENT DOCUMENTS

| | | | |
|---|---|---|---|
| 4,319,951 | 3/1982 | Korbelak et al. | 350/96.21 X |
| 4,332,435 | 6/1982 | Post | 350/96.20 |
| 4,359,262 | 11/1982 | Dolan | 350/96.22 X |
| 4,428,645 | 1/1984 | Korbelak et al. | 350/96.20 |
| 4,500,166 | 2/1985 | Kunze | 350/96.20 |
| 4,502,754 | 3/1985 | Kawa | 350/96.20 |
| 4,585,303 | 4/1986 | Pinsard et al. | 350/96.20 |
| 4,595,255 | 6/1986 | Bhatt et al. | 350/96.20 |

FOREIGN PATENT DOCUMENTS

| | | | |
|---|---|---|---|
| 1108904 | 9/1981 | Canada | 350/96.20 |
| 0043570 | 1/1982 | European Pat. Off. | 350/96.20 |
| 0108815 | 7/1982 | Japan | 350/96.20 |
| 0207213 | 12/1982 | Japan | 350/96.20 |
| 2040494 | 8/1980 | United Kingdom | |

*Primary Examiner*—William L. Sikes
*Assistant Examiner*—Akm E. Ullah
*Attorney, Agent, or Firm*—Lowe, Price, LeBlanc, Becker & Shur

[57] ABSTRACT

An optical fiber interconnecting and distributing box includes a base, a cover, and a movable pivotable panel dividing the box into two compartments. Rack-mounted connectors each connect an end section of a first optical fiber from an array of cables to an end section of a second optical fiber from another array of cables. The base contains practically circular flat loops of the first fibers that enter the first compartment through holes in a base wall. The cover contains the connectors. End sections of the first fibers run through an aperture in the panel. The second fibers are arranged as circular flat loops and have end portions entering the second compartment through sides of the cover. The first fibers are intended to be pre-wired, i.e. each first fiber is definitively ascribed to a connector. Distributing involves withdrawing the end section of a second fiber that is initially inserted in a connector into another connector. In one embodiment, the panel carries two racks for connecting the first and second optical fibers via optical fiber jumpers.

17 Claims, 11 Drawing Figures

INTERCONNECTING AND DISTRIBUTING BOX FOR OPTICAL FIBERS

BACKGROUND OF THE INVENTION

1. Field of the Invention

This invention relates to the connecting of optical fibers two by two from at least two arrays in which the optical fibers are arranged circularly or coplanarly. More particularly, the invention deals with a box for interconnecting optical fibers. The box offers the possibility of performing fiber distributing, in other words, fiber connection modifications.

2. Description of the Prior Art

Optical fiber connecting and distributing boxes are disclosed in United Kingdom Patent Application No. 2,040,494, German Patent Application No. 3,006,131 and European Patent Application No. 0,024,235. All these boxes have a cylindrical structure and are designed to connect ends of optical fibers from a first cable to ends of optical fibers from a second cable. The cables enter the box colinearly with the longitudinal axis of the box, through opposite ends of the box. Elementary connecting devices are housed in the box and substantially aligned with the transverse central plane of the box. Each connecting device connects an end of one optical fiber from the first cable to an end of an optical fiber from the second cable. Fiber connecting devices act as splicers and are generally cylindrical, often involving several support members requiring a lot of space; the connecting devices often must be entirely dismantled or replaced in order to modify the inter-fiber connections.

Also, certain boxes disclosed in United Kingdom Patent Application No. 2,040,494 and German Patent Application No. 3,006,131 contain spare loops of optical fibers to provide sufficient fiber length for access to the various fiber connecting devices. The spare loops are accommodated in the spaces between the cable-receiving ends of the box and a central connecting-device support member.

As a result of the optical fiber lay-out in known connecting boxes, the connecting and distributing operations are very time-consuming and tricky and require complex and special tooling, further the box is decidedly bulky in size.

OBJECTS OF THE INVENTION

The main object of the invention is to obviate the foregoing drawbacks and in particular to provide an optical fiber interconnecting and distributing box having reduced dimensions although the box affords high connection capacity and easy access to the end sections of the optical fibers and the fiber connecting devices.

Another object of the invention is to provide a structure permitting low-cost fiber connections involving a reduced number of members and a very small number of members to be dismantled.

The service life of an optical fiber which depends primarily, during connecting work, on the minimum bending radius that an optical fiber can sustain without affecting the physical characteristics of the fiber. Experience has proved that fiber service life is not penalized when the bending radius applied to the fibers is equal at least to a minimum radius, $r = 50$ mm.

SUMMARY OF THE INVENTION

In one embodiment of the invention a fiber interconnecting box, there is direct distributing between two optical fiber arrays; in a second embodiment distributing is via optical jumpers between optical fiber arrays.

The first embodiment includes a box for interconnecting first and second optical fiber arrays. The box is composed of superposable first and second receptacles. The box includes several optical fiber connecting devices each connecting an end section of an optical fiber from the first array to an end section of an optical fiber from the second array, and a movable panel dividing the box into a first compartment and a second compartment. The first compartment contains flat loops of fibers from the first array entering via at least one hole in the first receptacle. The second compartment contains the optical fiber connecting devices and flat loops of the fibers from the second array. The end sections of the fibers from the first array run through an aperture in the panel and have ends respectively inserted in the connecting devices. The fibers from the second array enter via at least one hole in the second receptacle and have ends respectively inserted in the connecting devices.

The first embodiment offers the following advantages:

the box consists of only three members, namely the two receptacles and the panel;

spare loops of fibers are coiled flat and can be superposed in the compartments thereby reducing the overall dimensions of the box that is limited practically only by the loop bending radius r;

accessibility to the fibers is straightforward since the panel may be pivotably mounted on the first receptacle thus giving access to the first compartment containing the fiber loops from the first array;

when coiling fibers from the second array, the first compartment is fully shut by the panel that prevents tangling of the fibers from the two arrays and makes it possible to pre-wire the first array fibers;

the fibers in the second array are distributed, i.e. the links of the fibers in the second array to the fiber connecting devices may be modified once the fibers in the first array are protected by folding down the panel on the first receptacle;

the fiber connecting devices are accessible simply by taking away the second receptacle that acts as a cover for the box.

The second embodiment includes a box for interconnecting two arrays of optical fibers. The box is composed of superposable first and second receptacles. The box includes several optical fiber connecting devices each connected to the end section of an optical fiber from one of said arrays and a movable panel. The panel divides the box into a first compartment and a second compartment. The first compartment lies at least partly in the first receptacle and contains the end sections of fibers from both arrays, two series of optical fiber connecting devices respectively ascribed to the two optical fiber arrays, and flat loops of jumpers in optical fiber form; each loop links a connecting device of one of the two series to a connecting device of the other series. The second compartment contains flat loops of fibers from both arrays entering via holes in the second receptacle.

The second embodiment has advantages similar to those of the first embodiment; in addition the ends of the optical fibers in all the arrays in the box may be pre-wired. Only by changing jumper connections is it possible to distribute, i.e. modify connections between fibers, thereby enhancing the reliability of the optical fibers in the arrays thus handled only once. The box may comprise several panels pivoting about one and the same axis, thereby increasing the connecting capacity in respect of the relatively reduced volume of the box. The division between compartments as separated off by the panels restricts the risk of unwanted connections.

BRIEF DESCRIPTION OF THE DRAWING

Other objects, advantages and features of this invention will become clear from the following detailed description of several preferred embodiments of the invention with reference to the accompanying corresponding drawings in which.

DESCRIPTION OF THE PREFERRED EMBODIMENTS

Figure 1:
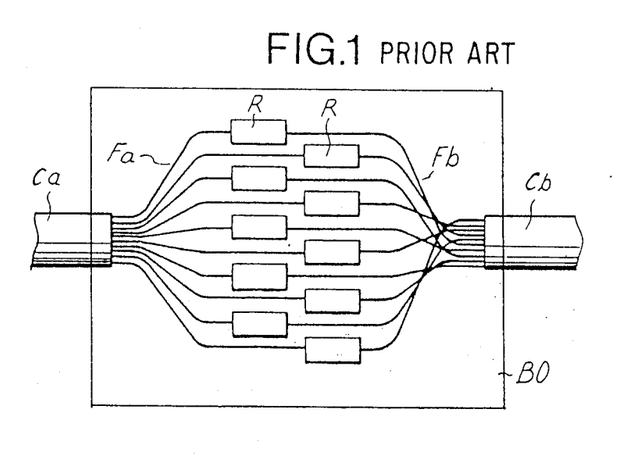
FIG. 1 is a schematic drawing of a prior art for connecting two optical fiber cables with no jumper.

FIG. 1 is a schematic drawing of a known cylindrical connecting box B0 for connecting two cables Ca and Cb including respective optical fibers Fa and Fb by means of elementary connecting devices. An elementary connecting device is denoted hereafter "connector" and connects the end of an optical fiber Fa in the first cable Ca to the end of an optical fiber Fb in the second cable Cb. The bottom and cover of the box respectively form lower and upper shells. The common plane of the two shells, where they intersect, contains the longitudinal alignment axis of the oppositely facing ends of cables Ca and Cb.

The fibers Fa and Fb are splayed out starting from where cables Ca and Cb have had the cladding removed. Inside box B0, means for bearing connectors R consist for example of circlips into each of which a connector is slipped. The connectors are arranged along either side of the small central axis, in this case vertical, of box B0. A relatively large space can be provided between the cladded end of each cable Ca, Cb and the connectors R to accomodate long sections of optical fibers Fa, Fb, so an operator may have sufficient length to pull on the fibers when connecting.

A description is now given of a first embodiment of a connecting and distributing box embodying the invention. The box makes it possible to distribute or mix directly, as before, optical fibers Fa from a first array Ea with a view to connecting them respectively to optical fibers Fb from a second array Eb, without going via optical jumpers but rather directly via connectors. For the first embodiment, the optical fiber arrays Ea and Eb are composed of several respective optical cables $Ca_1, Ca_2, \ldots Ca_p, \ldots Ca_{P-1}, Ca_P$ and $Cb_1, Cb_2, \ldots Cb_p, \ldots Cb_{P-1}, Cb_P$ where the integer index p varies between 1 and P. Each cable $Ca_p, Cb_p$ contains M respective optical fibers Fa, Fb. Each cable comprises a helicoidally grooved cylindrical ring including grooves, each containing an optical fiber, or a central cylindrical strength member around which optical fibers are wrapped either in a gelifying material or inside individual tubes; alternatively each cable includes a grooved flat holder on which optical fibers are coplanarly held in a linear-array or ribbon form. Several elementary cables such as cables $Ca_p$ or $Cb_p$ constitute sub-cables enclosed inside a common sheath of a composite cable.

Moreover, the connectors or elementary connecting devices employed in this invention are preferably of such types as described in U.S. patent application Ser. No. 532,108 filed on Sept. 14, 1983 in the name of Robert P. DELEBECQUE and the U.S. patent application Ser. No. 568,504 filed concurrently herewith in the name of Robert CALAVO, Vincent DEWEZ and Marcel GARCIA.

According to U.S. patent application Ser. No. 532,108, a connector for connecting end sections of two optical fibers Fa and Fb comprises a housing including a fiber holder having a groove for receiving, aligning and joining endface-to-endface the fiber end sections and bearing surfaces on either side of the groove for bearing the claddings of the two fibers. The housing also comprises first pressers for pressing the fiber end sections into the groove, and second pressers for pressing the two fiber claddings onto the bearing surfaces. The first and second pressers are slidably mounted in the housing above the groove and the bearing surfaces on the holder and are pulled to the groove and the bearing surfaces by first and second springs respectively.

According to the concurrently filed U.S. patent application, a connector for connecting the end sections of two optical fibers Fa and Fb comprises a base member including on a major side a fiber-receiving groove for aligning and abutting the end sections of the two fibers on either side of a fiber endface connection plane, and a bent spring fastener, preferably U-shaped, having on either side of a fastener bend a flexible portion above the base member major side and a second portion that contacts the base member. The flexible portion of the spring fastener has one edge opposite the fastener bend. The flexible portion edge is free and accessible from one of two edges of the base member on either side of said groove to deflect only the flexible portion in front of the base member major side when end sections of the two fibers are inserted in the groove. The second portion of the spring fastener is anchored to the base member. The flexible portion presses the fiber ends into the groove at least in the immediate vicinity of the fiber endface connection plane.

These types of connector afford the following main advantages:

good optical signal transmission quality at the connection plane between the endfaces of the fiber end sections and high reliability despite the relative simplicity of the connector structure and the connector member handling;

the connection itself does not involve any craft other than that involved in splicing electrical cable leads, and is very quick to execute because there is no need to disassemble the members making up the connector; and as a corollary thereto, the tooling required in the connecting work is simple and the connecting cost is reduced;

reversibility of the optical connection, i.e. possibility of disconnecting and reconnecting optical fibers a great many times using the same connector with no disassembling and replacement of the connector members;

the thin parallelepipedal shape of the connectors means that piling up into far from bulky stacks may be achieved where the thickness of space allocated to each connector is 4 to 5 mm approximately.

As regards the latter advantage, the thin parallelepipedal connectors are plugged together between parallel, and preferably removable, partitions. The partitions are secured to a support plate S forming a compact parallelepipedal rack. Between two neighboring partitions, the support plate carries flexible tabs, tongues, bosses or the like to lock a connector by means of two lateral notches in the connector. Stacking the connectors permits reduced dimensions and enables the optical fibers can, to if necessary, be connected without removing the connectors since ends of the fiber pressing means in the connectors are accessible from the top of the rack S using a simple handling tool.

Figure 2:
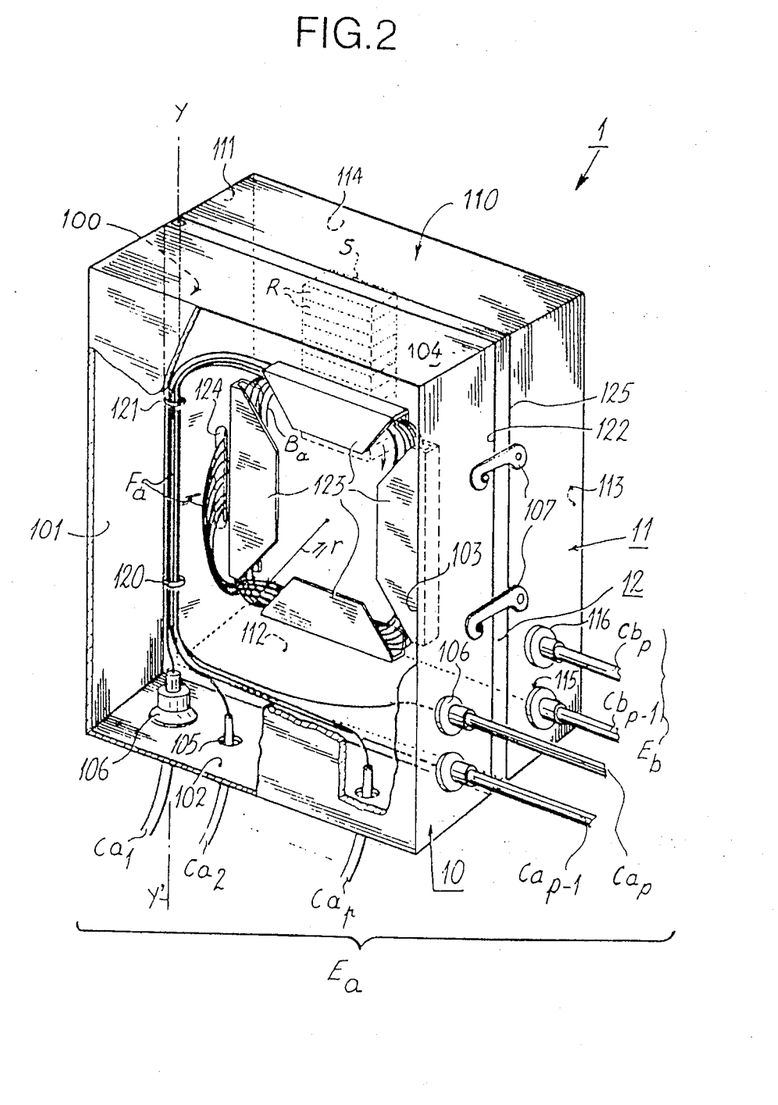
FIG. 2 is a rear perspective view of a connecting and "direct" distributing box embodying the invention.

A direct connecting and distributing box 1 embodying the invention is depicted in FIG. 2. Box 1 is adapted to connect optical fibers Fa from first cables $Ca_1$ to $Ca_P$ of a first array Ea to optical fibers Fb from second cables $Cb_1$ to $Cb_P$ of a second array Eb, through connectors R on a rack S as described above.

The box 1 is parallelepipedal in shape. Box 1 comprises a first receptacle 10, a second receptacle 11 and a movable panel 12. The first receptacle 10 and second receptacle 11 form the base and cover of box 1 and are superposable. The panel 12 forms a rectangular partition between the base and cover thereby dividing the box into a first parallelepipedal rear compartment 100 that is defined in space by the walls of base 10, and a second front parallelepipedal compartment 110 that is defined in space by the walls of cover 11. Panel 12 can be fixed to front edges of the base 10 or rear edges of the cover 11. The panel 12 is preferably mounted on the base 10 to give easier access to the connectors R on the rack S that are contained in front compartment 110. Panel 12 can be secured to the front edges of the base 10 by screws, by being clipped on or the like or preferably, can be pivotably mounted about hinging axis Y'Y of a hinge along the front edge of one wall on base 10, such as side 101 of base 10 in FIG. 2. In the latter case, panel 12 is pivoted outwards from base 10 about the axis Y'Y so the optical fibers Fa can be coiled; panel 12 and is then folded against stops in the vicinity of the edges of the other three sides, 102, 103 and 104 of base 10.

The first cables $Ca_1$ to $Ca_P$ enter rear compartment 100 via holes 105 that are provided in at least one of the sides of base 10, such as the side 102 adjacent to side 101 bearing the hinge to panel 12, preferably, holes are provided in three sides 102, 103 and 104 of base 10. Holes 105 may each carry a grommet 106, such as a rubber sleeve, through which a cladded end section of respective cable $Ca_P$ is slipped. Grommet 106 seals the cable to box junction. Once the claddings of cables $Ca_1$ to $Ca_P$ have been stripped over a long section starting from the inner faces of the sides to base 10, and, if need be, the cable central strength members, if they exist, have been cut off in front of the inner faces, the optical fibers Fa of cables $Ca_1$ to $Ca_P$ are led away and then gathered together into bundle.

The fibers Fa leaving cables $Ca_1$ to $Ca_P$ are slipped into rectilinear guiding means 120–121 that are parallel and adjacent the hinging axis Y'Y of panel 12. As shown in FIG. 2, the fiber guiding means 120–121 are fixed to rear face 122 of panel 12. The fiber guiding means are made up of at least two tubular sections or two, preferably split rings 120 and 121 having aligned axes parallel to axis Y'Y. The distance between the extreme rings 120 and 121 depicted in FIG. 2 can be equal to approximately 400 times the nominal diameter of an optical fiber such that the optical fibers Fa may flex and twist.

After rectilinear guidance through guiding means 120–121, from bottom to top for the illustrated embodiment, the bundle of optical fibers Fa is then coiled to form a "Flemish" coil, i.e. flat, against rear face 122 of panel 12 in several practically circular and superposed spare loops Ba. The loops Ba enable an operator to have sufficient lengths of fibers Fa available to prepare the fiber ends and to insert the fiber ends in connectors R. The loops Ba constitute reserves of fibers should an incident arise requiring reworking of the connections or recutting of the fiber ends. In order to coil the fibers Fa correctly without tangling the fibers, i.e. without entwining the fibers and to hold them in a curvilinear bundle with a minimum bending radius $r = 50$ mm, coplanar gulleys 123 having a U-shaped transverse cross-section are provided on rear face 122 of panel 12. As shown in FIG. 2, four gulleys 123 are arranged around the sides of a square that encloses a circle having a radius greater than minimum radius r. The gulleys may be arranged in other than square form such as rectangular, oval, etc. Free arms of gulleys 123 are oriented toward the interior of rear compartment 100 and are shaped as isoceles-trapezoids. The arms of gulleys 123 are spaced from one another so the fibers may be inserted and held in space loops Ba. In lieu of the gulleys or conjointly therewith, use can be made of quick fit or clasp type rings that encircle the bundle of fibers Fa. The quick fits have front pins that are snapped into holes circularly arranged on rear face 122 of panel 12. In FIG. 2, only a few spare loops Ba of the fiber Fa bundle are illustrated so as not to overload the drawing although in practice, ten or so loops can be formed for each optical fiber in a clockwise direction.

The optical fibers Fa are then pulled, in the illustrated embodiment, from lower gulley 123, through an oblong aperture 124 in panel 12 between guiding means 120–121 and the rear coiling surface defined by the spare loops Ba. Aperture 124 is preferably made at mid-height between aligned rings 120 and 121 and the bottom of left hand vertical gulley 123, as depicted in FIG. 2. The bundle of fibers Fb thus extends past front face 125 of panel 12 with sufficient length for fiber Fa insertion into connectors R. After the foregoing operations, panel 12 is turned about the axis Y'Y and is pushed onto the front face of base 10 thereby shutting rear compartment 100. Panel 12 is anchored to base 10 by an adequate locking device including one or more catches 107 that are secured to the front edge of base 10 against which the free edge of panel 12 parallel to and opposite axis Y'Y comes to rest.

Figure 3:
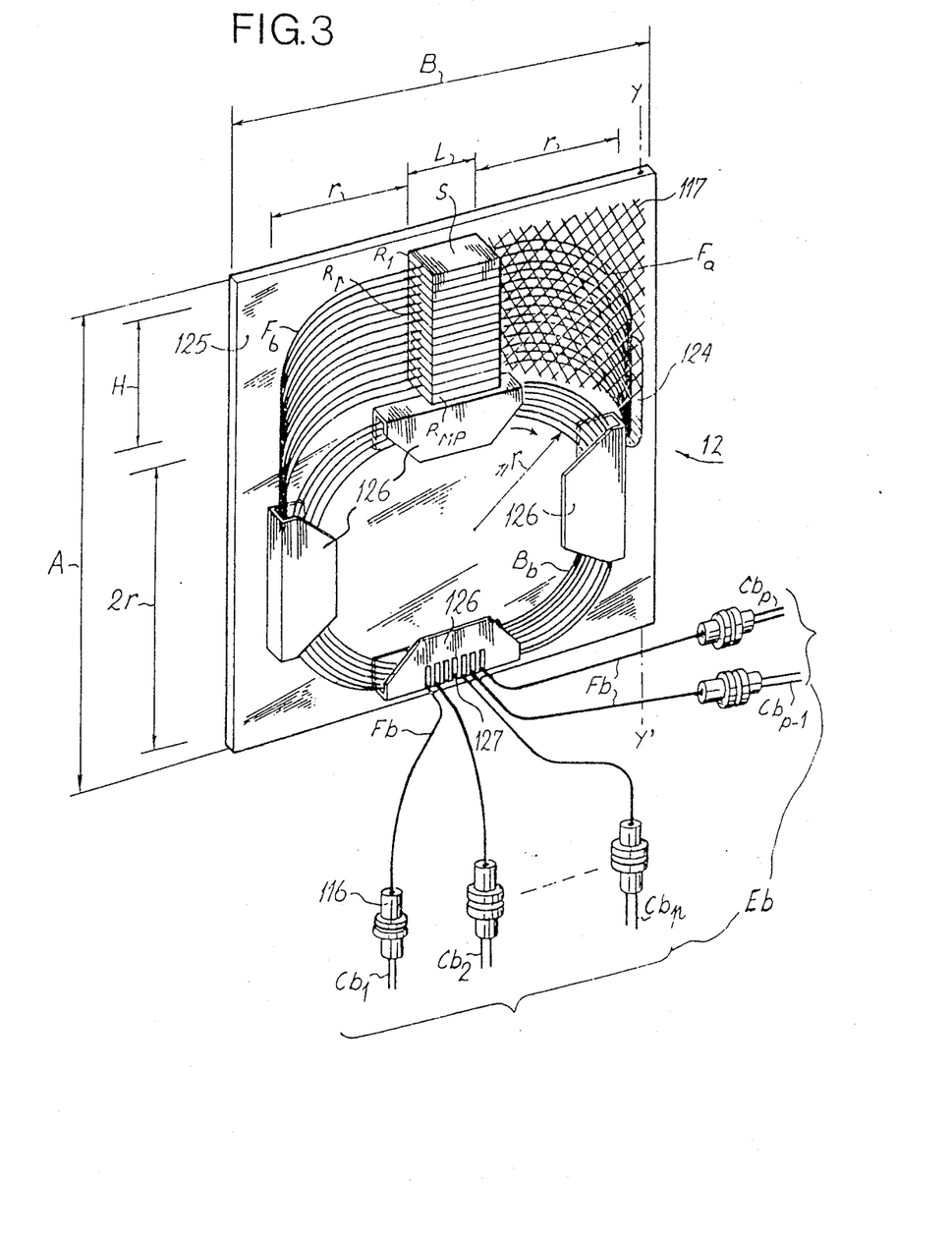
FIG. 3 is a perspective view of the front face of a panel included in FIG. 2 box.

On the upper portion of front face 125 of panel 12, as shown in FIG. 3, is a stack of connectors $R_1$ to $R_{MP}$ embraced between partitions of rack S. Rack S is vertically secured to front face 125 by screws for example. As already stated, the connectors R comply with those disclosed in said U.S. patent application Ser. No. 532,108 and said U.S. patent application filed this day. The major rectangular sides of the connectors R are arranged horizontally. The edges of the connectors R giving access to the fiber pressing means, to clear the grooves on the holder or base member in connectors and to insert therein the fiber ends are opposite the major inner face of cover 11. The end sections of fibers Fa going out through aperture 124 are threaded into a first half of grooves in connectors R, one fiber Fa per connector. The number of connectors R is equal to or greater than the total number $M \times P$ of fibers contained in an array Ea, Eb. Preferably, the first cables Ca constitute "pre-wired" cables, i.e. a connector R is ascribed once and for all to each fiber Fa in the first array Ea, whereupon the connections are distributed, i.e. modified by a variable choice of a connector R for each of optical fibers Fb in the second array Eb. In order to protect the "pre-wired" fibers Fa in front compartment 110, protecting grills 117, fixed to panel front face 125, cover the end sections of fibers Fa after the fibers have been inserted into the connectors R. After fibers Fa have been pre-wired, all the operations, especially distributing, are carried out in front compartment 110, with panel 12 folded against base 10 protecting fibers Fa.

The operator then coils fibers Fb flat and inserts the end sections of coiled fibers Fb in connectors R. First of all, the second cables $Cb_1$ to $Cb_P$ are fed through holes 115 that are provided in at least one of sides 111, 112, 113 and 114 of cover 11 and that may be each fitted with a grommet 116, as shown in FIG. 2. Once the fibers Fb from second cables have been fanned out in front compartment 110, in an analogous fashion to fibers Fa, fibers Fb are gathered together into a bundle. The fiber Fb bundle is coiled flat into spare, partically circular loops Bb that are superposed to run in the opposite direction to loops Ba of fibers Fa that are coiled counterclockwise viewed from front face 125 of panel 12. Loops Bb provide sufficient extra lengths of fibers Fb to conveniently prepare the end sections of fibers Fb and to insert such into the half-grooves, to the left hand in FIG. 3, in connectors R. Loops Bb are also intended to overcome any incident that might require connection rework and to carry out distributing, i.e. modifications of optical connections. Distributing consists for example of withdrawing the end section of a fiber Fb that is initially inserted in a connector, such as the connector $R_1$, and of inserting the end section of the fiber Fb in another connector such as the connector $R_p$ (FIG. 3).

The coiling area for fibers Fb is marked off in the lower portion of front face 125 of panel 12, beneath rack S, by four coplanar gulleys 126 that are mutually arranged in a square in an analogous fashion to gulleys 123 on panel rear face 122. Each gulley 126 is also U-shaped in cross-section and has a large free front arm and a small rectangular rear arm. The front arm of gulley 126 has an isoceles trapezoid shape. The rear arm of gulley 126 is secured to front face 125 of panel 12 in the fiber Fb coiling area. As shown in FIG. 3, the fibers Fb leaving the ends of second cables $Cb_1$ to $Cb_P$ from grommets 116 in the sides of cover 11 enter the coiling area through vertical slits 127 in the trapezoidal front arm of the lower horizontal gulley 126, are then coiled in the four gulleys 126 into several spare loops Bb and finally leave the upper edge of left hand vertical gulley 126 for insertion of the fiber Fb end sections into the left hand halves of the grooves in connectors R.

Figure 4:
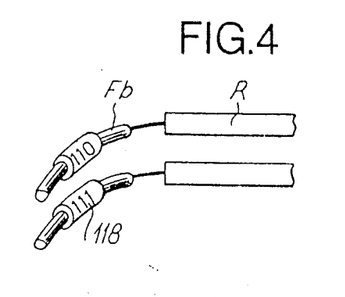
FIGS. 4, 5 and 6 depict various ways of marking the optical fibers.
Figure 5:
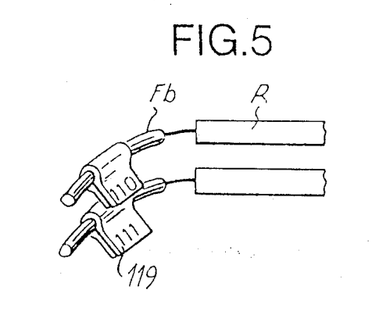
Figure 6:
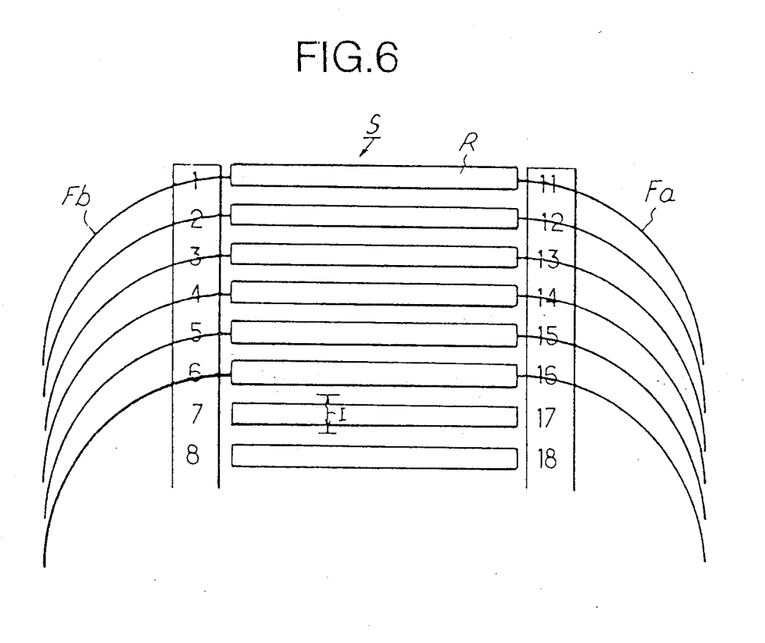

To mark the fibers Fa, Fb, use may be made of ring-sleeves 118 shown in FIG. 4 or tags 119 shown in FIG. 5 each slipped over the cladded end of a fiber Fa, Fb and carrying a respective number, alternatively the fibers are marked by numbering in the vicinity of both ends of connectors R in rack S as shown in FIG. 6. When all the end sections of fibers Fb have been inserted in the respective connectors R, cover 11 is shut on base 10 and secured thereon by screws, snap-catches or similar means.

One of the advantages of the internal organization of the fibers in direct connecting and distributing box 1 relates to the reduced dimensions of the box. For example, with reference to FIG. 3, the height A and width B of a box, i.e. of panel 12 and the major faces of base 10 and cover 11, are calculated as follows for connecting fibers one to another from two arrays Ea et Eb each containing $P=5$ cables each having $M=10$ fibers:

width of the rack: $L=40$ mm;

height of the available gap for a connector: $I=5$ mm (FIG. 6);

height (length) of the rack containing $M \times P = 50$ connectors; $H=I(M.P+1)$, i.e. $H=5(10.5+1)=255$ mm;

tolerance on box height A: $\epsilon = 10$ mm;

height A of the box: $A=(H+2r)+\epsilon$, i.e. $A=255+100+10=365$ mm;

tolerance on box width B: $3\gamma=30$ mm;

width B of the box: $B=(L+2r)+3\epsilon$, i.e. $B=40+100+30=170$ mm.

Figure 7:
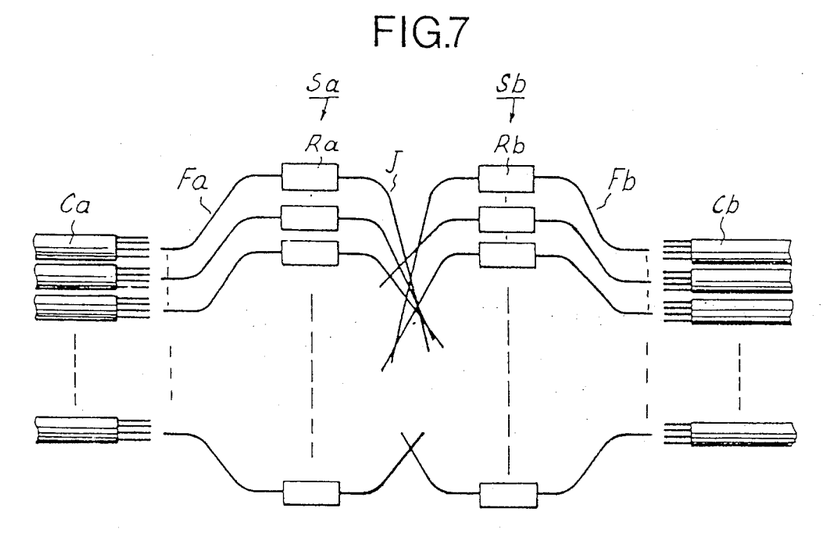
FIG. 7 is a schematic drawing of two arrays of optical fiber cables connected via optical jumpers.

A second embodiment of a connecting and distributing box relates to distributing between several cables Ca and Cb, as schematically shown in FIG. 7. The fibers Fa, Fb of each cable Ca, Cb are respectively inserted in connectors Ra, Rb of a respective rack Sa, Sb. Each connector Ra is then linked to one of connectors Rb via an optical link cord called jumper J. Each jumper consists of an optical fiber and is disposed in the space between the two parallel racks Sa and Sb.

The method of distributing via jumpers doubles the number of connections to be made and consequently doubles substantially the time and cost of the operations for an equal number of connections as in the "direct" distributing method (FIG. 1). However, distributing via jumpers advantageously permits definitive pre-wiring of the fibers Fa and Fb in the respective connectors Ra and Rb, i.e. makes it possible to ascribe definitively each fiber entering the box to a connector. A fiber Fa from a first cable Ca is connected separately to a fiber Fb from a second cable Cb via a jumper J, when needs so dictate. The jumpers are easier to handle and to arrange in coiling areas than the cable fibers. With no action at a later stage on the relative lay-out of pre-wired fibers Fa, Fb, any connection between any fiber Fa and any fiber Fb is executed either by reusing a jumper already in the box, or by inserting a new jumper or a free jumper and by disconnecting the ends of two initial jumpers linked to the fibers to be connected.

Figure 8A:
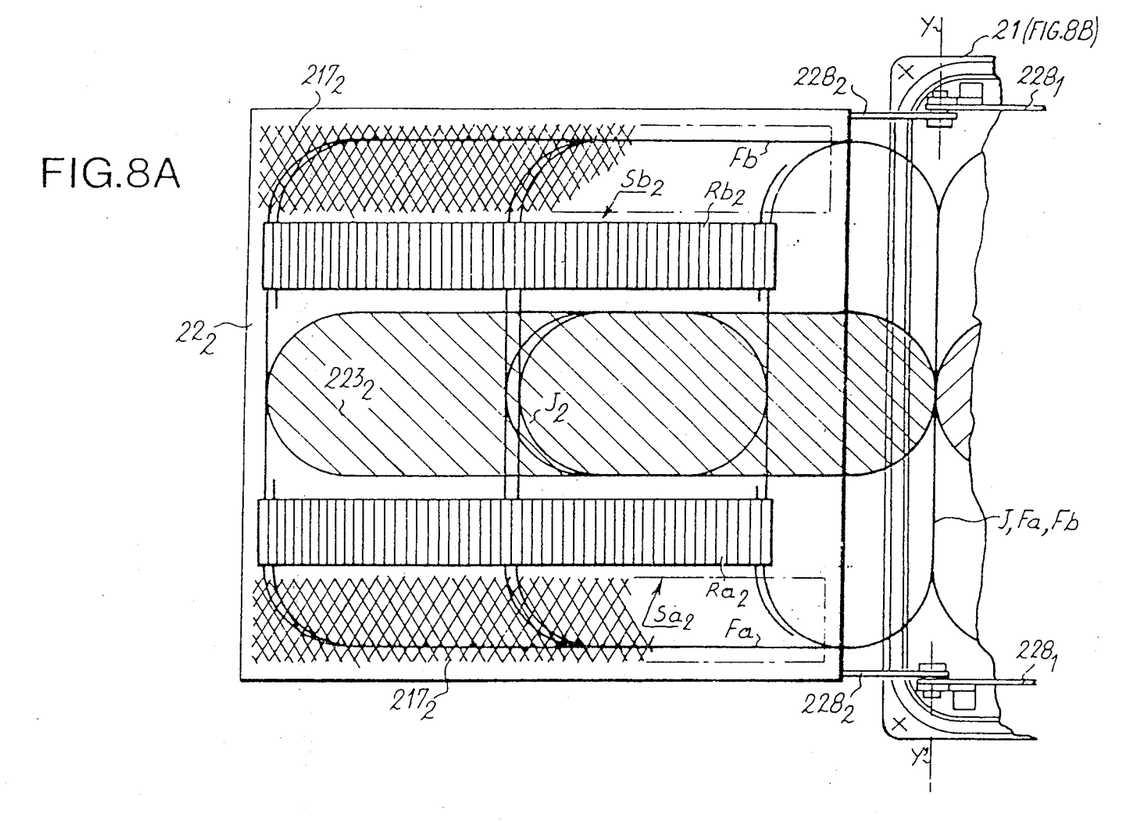
FIGS. 8A and 8B are respectively a front view of the base of another connecting and distributing box embodying the invention, the box containing jumpers, one panel folded over the base, and another panel pivotably raised through an angle of approximately 180°.
Figure 8B:
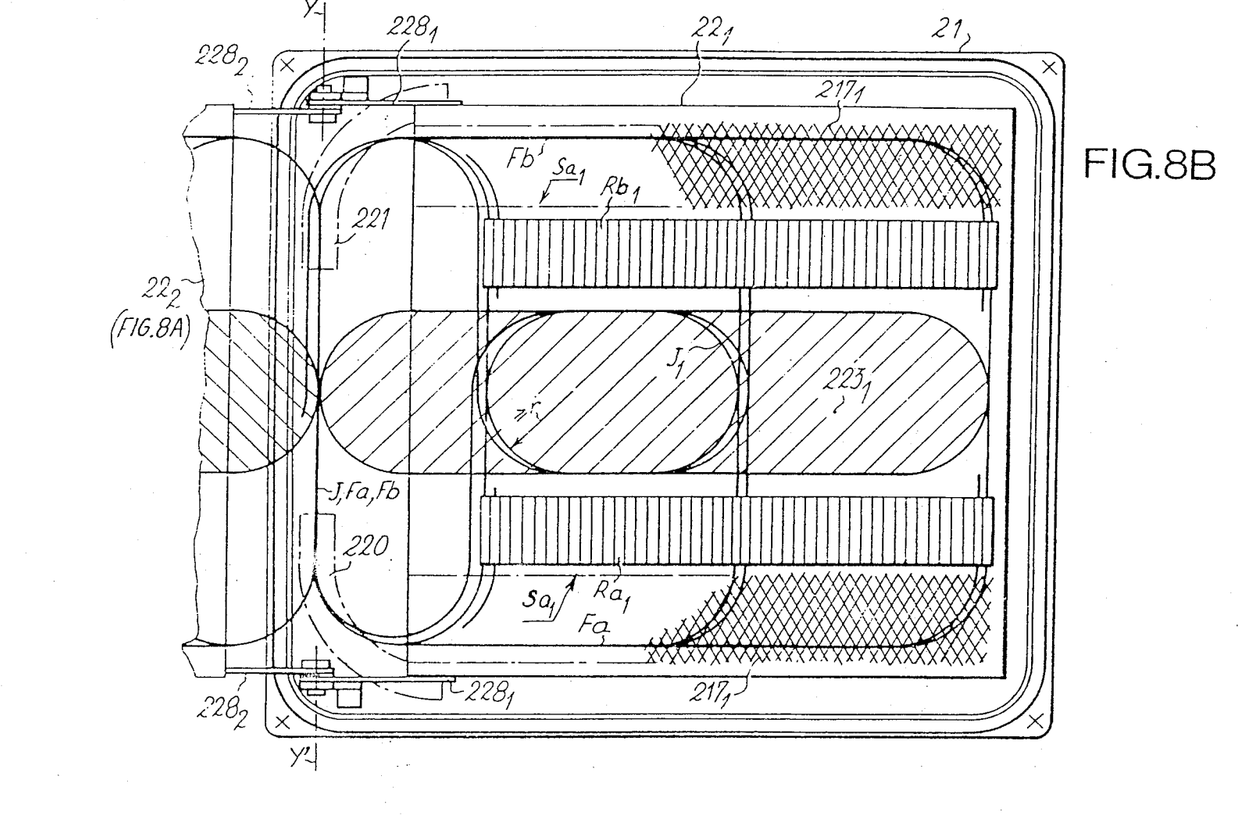
Figure 9:
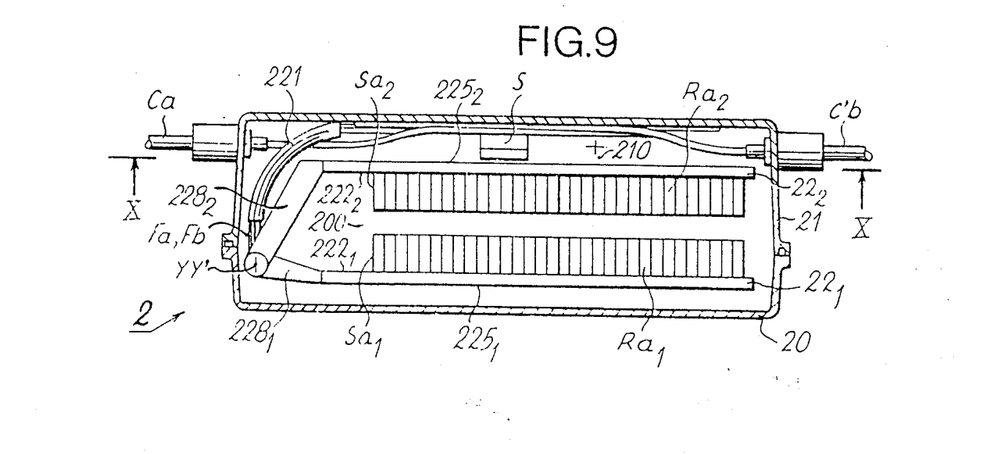
FIG. 9 is a partial cross-sectional plan view of the FIGS. 8A and 8B box.
Figure 10:
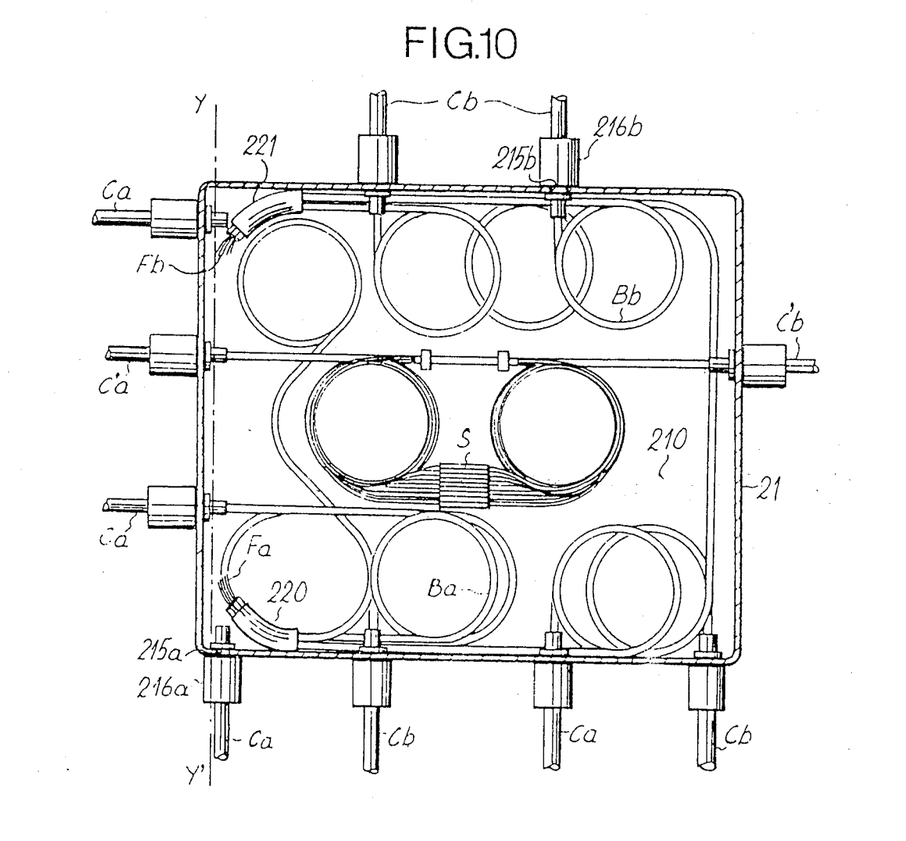
FIG. 10 is a cross-sectional view taken along line X—X in FIG. 9, of the inner face of the base of the box in FIGS. 8A and 8B.

A connecting and distributing box 2 using jumpers is depicted in FIGS. 8 to 10. Box 2 is designed to connect a fiber Fa, Fb from any cable Ca, Cb among a plurality of cables to an optical fiber Fa, Fb from any other cable in the same plurality of cables. Box 2 is also parallelepipedal in shape and made up of a cover 20 and a base 21. In a first compartment 200 of box 2 are several panels pivotably mounted about a vertical axis Y'Y integral with base 21 and incorporated in a vertical corner of base 21 to the left side of FIGS. 8B and 9. According to the embodiment shown in FIGS. 8 to 10, box 2 encloses two movable panels $22_1$ and $22_2$. Each panel $22_1$, $22_2$ comprises two arms $228_1$, $228_2$ that are hinged about the axis Y'Y with no translational movement along axis Y'Y; arms are $228_1$, $228_2$ are angled such that the panels $22_1$, $22_2$ may be arranged parallel to the major sides of cover 20 and base 21 when box 2 is closed. When box 2 is open, each panel $22_1$, $22_2$ can pivot through approximately 180° outwards from base 21 as shown in FIG. 8A.

Secured in parallel on one of the major vertical rectangular faces $222_1$, $222_2$ of each panel $22_1$, $22_2$ are two horizontal racks $Sa_1$ and $Sb_1$, $Sa_2$ and $Sb_2$ of connectors $Ra_1$ and $Rb_1$, $Ra_2$ and $Rb_2$. Provided between the two racks on a same panel are a coiling areas $223_1$, $223_2$ for jumpers $J_1$, $J_2$ to connect a connector from one of the two racks to a connector from the other rack. Preferably, as shown in FIG. 9, panels such as panels $22_1$ and $22_2$ at the ends of the stack of panels, have major faces $225_1$ and $225_2$ respectively opposite the inner faces of cover 20 and base 21 that carry no connector rack.

Provided on coiling areas $223_1$, $223_2$ of jumpers $J_1$, $J_2$ are one or more arrays of gulleys (not shown), such as the gulleys in FIGS. 2 and 3, so that spare loops may be taken up for the jumpers with a radius equal at least to the minimum radius r=50 mm. Indeed, the jumper length is variable and depends on the jumper routing between two connectors to be linked via the jumper that may be either on the same panel or on two respective panels among the plurality of panels. When a jumper links two connectors on different panels, the jumpers leaving the coiling area of one of the panels routes through guiding means 220-221, such as tubes or rings, that are partly integral with one of the panels and partly integral with base 21 and partly integral with the other panel, as shown in FIGS. 8A and 8B. The guiding means permit a rectilinear path for the jumpers along the vertical pivot axle Y'Y of the panels. The guiding means serve further in routing the long end sections of optical fibers Fa and Fb toward the respective connectors, where the end sections of fibers Fa and Fb may be protected by grills $217_1$ and $217_2$ shown in FIGS. 8A and 8B.

As depicted in FIG. 9, the panels folded toward base 21 leave a free compartment 210 between the major inner face of base 21 and the last panel, such as panel $22_2$, opposite the base. Compartment 210 shown in FIG. 10 is available to accommodate coils of incoming fibers Fa and Fb and is accessible by pivoting the panels outward from base 21. The optical fiber cables Ca, Cb to be connected enter via holes 215a, 215b carrying grommets 216a, 216b and made in the four sides of base 21. As soon as the cables enter the base, the cladding is stripped from them thereon, but the flexible strength member thereof, if there is one, is not cut immediately. The flexible strength members, complete with the fibers, are coiled flat against the inner major face of base 21 in spare loops Ba, Bb having a radius equal at least equal to r=50 mm. Loops Ba, Bb are held by arrays of gulleys (not shown) analogous to gulleys in FIGS. 2 and 3. The strength members are cut only upon leaving the gulley arrays where the fibers Fa and Fb run via a rectilinear routing through guiding means 220-221 along the pivot axis Y'Y toward the respective connectors on the panels.

Some cables, such as cables C'a and C'b, do not need to be connected via jumpers, but may only be connected two by two. In this case, as shown in the center of FIG. 10, the inner face of base 21 carries a connector rack S for direct distributing together with gulleys (not shown) for coiling the fibers of cables C'a and C'b into spare loops with a radius equal at least to r=50 mm.

In FIGS. 8 and 10, auxiliary means for guiding, coiling and marking the fibers and jumpers are not shown in order not to overload the drawings. The latter means are practically analogous to guiding, coiling and marking means included in direct distributing box 1. Box 1 may also contain several panels which pivot about the same axis and each bear guiding and coiling means and a connector rack for direct distributing of fibers from the two respective arrays.

The connector racks on panel 12 of direct distributing box 1, FIG. 2, can be replaced by two parallel connector racks to distribute via jumpers. Each connector on one of two racks makes it possible to link an optical fiber from the respective array Ea, Eb to an optical jumper J having another end inserted in a connector on the other rack. Front face 125 of pannel 12 (FIG. 3) may thus be analogous to a face $222_1$, $222_2$ of a panel $22_1$, $22_2$ (FIGS. 8 and 9) and carry coplanar gulley- or ring-type members that are evenly spaced out around one or more circles and that contain the jumper loops coiled flat between the two racks.

What we claim is:

1. A box for interconnecting first and second optical fiber arrays comprising a panel mounted in said box dividing said box into first and second compartments, each of said compartments having at least one aperture for receiving a fiber of the arrays that extends from out of the box into the box, said panel having at least one aperture for receiving a fiber of the arrays that extends between said compartments, plural optical fiber connecting devices mounted in said second compartment, each optical fiber connecting device connecting an end section of an optical fiber from said first array to an end section of an optical fiber from said second array, fibers of said first array entering the first compartment via the at least one aperture in the first compartment and being arranged in flat loops in said first compartment, the fibers from said first array having end sections extending from the flat loops in said first compartment through the at least one aperture of the panel into the second compartment and being inserted into said connecting devices, fibers of said second array entering the second compartment via an exterior wall in the at least one aperture in the second compartment and being arranged in flat loops in said second compartment, fibers from said second array having end sections in the second compartment inserted into said connecting devices so that the end sections of the fibers of the first and second arrays are connected together by the connecting devices in the second compartment.

2. The box of claim 1 wherein:
   said panel is pivotably mounted on one of said receptacles.

3. The box of claim 1 wherein:
   the loops of said fibers in said first and second compartments are oppositely directed.

4. The box of claim 1 further comprising:
   gulley-shaped fastening members coplanarly and evenly spaced substantially around a circle in each of said first and second compartments, said loops of fibers from the first and second array being carried in the fastening members of the first and second compartments respectively.

5. The box of claim 4 wherein:

said first receptacle includes a pivoting axis on which said panel is pivotably mounted, means fixed to a face of said panel defining the first compartment for rectilinearly guiding said fibers of said first array parallel to the panel pivoting axis so that said fibers extend through said guiding means before being coiled into the loops in the first compartment.

6. The box of claim 4 wherein:

said gulley-shaped members in each of said compartments are fixedly mounted on a face of said panel defining said compartment, said fibers from said second array running through slits in one of said gulley-shaped members in said second compartment before being coiled into loops in said members of said second compartment.

7. A box for interconnecting first and second optical fiber arrays comprising a panel mounted in said box dividing said box into first and second compartments, each of said compartments having an exterior box wall including at least one aperture for receiving a fiber of the arrays, said panel having at least one aperture for receiving a fiber of the arrays, first and second optical fiber connecting devices mounted in said second compartment, optical fiber jumpers mounted in said second compartment, each first optical fiber connecting device connecting an end section of an optical fiber from said first array to one end of one of said optical fiber jumpers, each second optical fiber connecting device connecting a second end of one of said optical fiber jumpers and one of the fibers from said second array, fibers of said first array entering the first compartment via the at least one aperture in the first compartment exterior box wall and being arranged in flat loops in said first compartment, the fibers from said first array having end sections extending from the flat loops in said first compartment through the at least one aperture of the panel into the second compartment and being inserted into said first connecting device, fibers of said second array entering the second compartment via the at least one aperture in the second compartment exterior box wall and being arranged in flat loops in said second compartments, fibers from said second array having end sections in the second compartment inserted into said second connecting devices, opposite first and second ends of the jumpers being respectively inserted into the first and second connecting devices so that the end sections of the fibers of the first and second arrays are optically coupled together by the connecting devices and the jumpers in the second compartment.

8. The box of claim 7 wherein:

said optical jumpers are coiled flat in loops between said first fiber connecting devices and said second fiber connecting devices.

9. The box of claim 8 further including:

gulley-shaped members mounted in said second compartments so as to be coplanarly and evenly spaced substantially around a circle, said jumper loops being mounted in said gulley-shaped members.

10. The box of claim 7 comprising:

first means for mounting said first connecting devices so they are parallel to said panel, and second means for mounting said second connecting devices so they are parallel to said panel, said first and second stacking means being secured to said panel in said second compartment so they are parallel to a face of the panel.

11. A box for interconnecting first and second arrays of optical fibers comprising a panel mounted in the box for dividing the box into first and second compartments, first optical fiber connectors mounted in the first compartment, end portions of certain fibers of the first and second arrays extending through exterior box walls of the first compartment into said first compartment being optically connected together by said first connectors, second and third connectors mounted in the second compartment, end portions of other fibers of the first and second arrays being respectively connected to the second and third connectors, optical fiber jumpers arranged as flat loops connected to the second and third connectors so that the end portions of the other fibers of the first and second arrays are optically coupled to each other via the jumpers and the second and third connectors, the other fibers of the first and second arrays being arranged in flat loops in the second compartment, the other fibers of the first and second arrays extending through an aperture in at least one wall of the second compartment.

12. The box of claim 11 wherein:

said second and third connectors are fixed in parallel fashion on only one face of said panel, the flat jumper loops being arranged in a coiling area between said second and third connectors.

13. The box of claim 11 wherein:

said panel face carries gulley-shaped fastening members coplanarly and evenly spaced substantially around several circles in said jumper loop coiling area and containing the jumper loops.

14. The box of claim 11 wherein:

each fiber array comprises flexible strengthening members supporting said fibers of said array, each fiber array being coiled into said loops with said flexible strength members of said array.

15. The box of claim 11 further including:

several movable parallel panels, said panels being contained in said second compartment, each panel carrying certain of said second and third optical fiber connectors.

16. The box of claim 15 wherein:

said panels are pivotably mounted on an exterior wall of said box.

17. The box of claim 11 further including first and second means secured to one face of each of said panel for respectively stacking said second and third connectors parallel to a face of each panel and parallel to each other.

* * * * *